US012781546B2

(12) United States Patent
Tomaszewski

(10) Patent No.: US 12,781,546 B2
(45) Date of Patent: Nov. 3, 2026

(54) CLOSURE LATCH ASSEMBLY WITH CINCH DISENGAGEMENT MECHANISM HAVING TOGGLE FEATURE

(71) Applicant: MAGNA CLOSURES INC., Newmarket (CA)

(72) Inventor: Kris Tomaszewski, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 141 days.

(21) Appl. No.: 18/738,543

(22) Filed: Jun. 10, 2024

(65) Prior Publication Data

US 2024/0410207 A1 Dec. 12, 2024

Related U.S. Application Data

(60) Provisional application No. 63/472,363, filed on Jun. 12, 2023.

(51) Int. Cl.

*E05B 81/90* (2014.01)
*E05B 81/20* (2014.01)
*E05B 85/26* (2014.01)

(52) U.S. Cl.

CPC .............. *E05B 81/90* (2013.01); *E05B 81/20* (2013.01); *E05B 85/26* (2013.01)

(58) Field of Classification Search

CPC .......... E05B 81/01; E05B 81/06; E05B 81/20; E05B 81/14; E05B 81/16; E05B 81/90; E05B 77/06; E05B 77/36; E05B 79/04; E05B 85/26; Y10T 292/1047; Y10T 292/1076; Y10T 292/1078; Y10T 292/1079; Y10T 292/1082; Y10T 292/108; Y10S 292/23

See application file for complete search history.

(56) References Cited

U.S. PATENT DOCUMENTS

| | | | | |
|---|---|---|---|---|
| 6,053,542 | A | 4/2000 | Ostrowski et al. | |
| 10,767,397 | B2 | 9/2020 | Ottino et al. | |
| 10,876,329 | B2 | 12/2020 | Dente et al. | |
| 10,895,095 | B2 * | 1/2021 | Cumbo | E05B 81/68 |
| 11,525,289 | B2 * | 12/2022 | Cumbo | E05B 81/20 |
| 2010/0235058 | A1 | 9/2010 | Papanikolaou et al. | |
| 2016/0244999 | A1 * | 8/2016 | Ottino | E05B 85/26 |
| 2017/0089103 | A1 | 3/2017 | Ottino et al. | |

(Continued)

FOREIGN PATENT DOCUMENTS

| | | | |
|---|---|---|---|
| EP | 1090197 | B1 | 11/2001 |
| GB | 2415990 | A | 1/2006 |

*Primary Examiner* — Christine M Mills
*Assistant Examiner* — Yahya Sidky
(74) *Attorney, Agent, or Firm* — Dickinson Wright PLLC

(57) ABSTRACT

A closure latch assembly for a vehicle door has a ratchet moveable between a primary striker capture position, a secondary striker capture position, and a striker release position, and a cinch mechanism moveable, while in an engaged state, from a home position, while the ratchet is in the secondary striker capture position, to a cinch position, whereat the ratchet is engaged by the cinch mechanism and moved to the primary striker capture position. A manual release mechanism operable to move the cinch mechanism from the engaged state to a disengaged state, whereat the cinch mechanism is disengaged from the ratchet such that the ratchet is free to move independently from the cinch mechanism.

23 Claims, 4 Drawing Sheets

(56) References Cited

U.S. PATENT DOCUMENTS

| | | | | |
|---|---|---|---|---|
| 2019/0161996 | A1 | 5/2019 | Taurasi et al. | |
| 2020/0115932 | A1* | 4/2020 | Ottino | E05B 81/01 |
| 2021/0025204 | A1* | 1/2021 | Nam | E05B 81/14 |
| 2022/0381072 | A1* | 12/2022 | Cumbo | E05B 81/34 |
| 2023/0112684 | A1 | 4/2023 | Cetnar | |
| 2023/0358080 | A1 | 11/2023 | Taurasi et al. | |

* cited by examiner

CLOSURE LATCH ASSEMBLY WITH CINCH DISENGAGEMENT MECHANISM HAVING TOGGLE FEATURE

CROSS-REFERENCE TO RELATED APPLICATION

This application claims the benefit of U.S. Provisional Application Ser. No. 63/472,363, filed Jun. 12, 2023, which is incorporated herein by reference in its entirety.

FIELD

The present disclosure relates generally to closure latches for a vehicle passenger door. More particularly, the present disclosure is directed to a closure latch equipped with a cinch disengagement mechanism.

BACKGROUND

This section provides background information related to closure latches and is not necessarily prior art to the closure latch of the present disclosure.

Many modern closure latches provide various power-operated features including power release, power lock and power cinch functions. Power cinch, also referred to as "soft close," completes closure of a vehicle door if the vehicle door is only partially closed. Typically, cinch mechanisms have a disengagement feature, which allows the vehicle door to be opened in case of a cinch malfunction, thereby allowing the ratchet to be intentionally moved from a cinched or striker capture position to a striker release position. Although known disengagement features are well suited for allowing a cinch mechanism to be overridden, they come with drawbacks. For example, known cinch override mechanism are activated automatically during each latch activation, regardless of how the latch activation is actuated, including both manually and via power assist. Accordingly, increased effort (force) must be imparted within the latch release mechanism every time the latch is activated. Accordingly, increased effort must be applied to the associated manual release mechanism (inside or outside release lever) or by the powered actuator motor during every latch release operation. Further, in vehicles not having an outside handle, but rather, having an outside electrical switch for activating a power release motor to effect opening the vehicle door, the outside switch cannot be used to disengage the cinch mechanism, and the power release motor typically does not have enough power to simultaneously perform release and cinch disengagement.

SUMMARY

This section provides a general summary of the disclosure and is not intended to be considered as a comprehensive and exhaustive listing of its full scope or all of its aspects, features and objectives.

It is an aspect of the present disclosure to provide a closure latch assembly for a vehicle closure panel, with the closure latch assembly having a cinch mechanism that can be coupled and decoupled from a latch mechanism of the closure latch assembly.

It is s further aspect of the present disclosure to provide the closure latch assembly with a coupling/decoupling mechanism that automatically couples the cinch mechanism with the latch mechanism of the closure latch assembly while in a cinching mode and allows manual decoupling of the cinch mechanism from the latch mechanism of the closure latch assembly during interruption of power to the cinch mechanism.

A closure latch assembly for a vehicle door includes a latch mechanism having a ratchet and a pawl. The ratchet being moveable between a primary striker capture position, a secondary striker capture position, and a striker release position, and the pawl being moveable between a primary ratchet holding position, whereat the pawl holds the ratchet in the primary striker capture position, and secondary striker capture position, whereat the pawl holds the ratchet in the secondary striker capture position, and a ratchet releasing position, whereat the pawl permits the ratchet to move to its striker release position. Closure latch assembly further includes a cinch mechanism moveable, while in an engaged state, also referred to as engaged position, from a home position, while the ratchet is in the secondary striker capture position, to a cinch position, whereat the ratchet is engaged by the cinch mechanism and moved to the primary striker capture position, and reset back to the home position, whereat the ratchet remains the primary striker capture position. A manual release mechanism is operable to move the cinch mechanism from the engaged state, whereat the cinch mechanism is engaged with the ratchet, to a disengaged state, also referred to as disengaged position, whereat the cinch mechanism is disengaged from the ratchet, wherein the ratchet is free to be returned to the primary striker capture position and/or moved from the primary striker capture position to the striker releasing position while the cinch mechanism is in the disengaged state.

In accordance with another aspect of the disclosure, the manual release mechanism includes a cinch disengagement lever operably coupled to a cinch pulley of the cinch mechanism for lost motion with the cinch pulley as the cinch pulley rotates from a home position to an actuated position, the cinch disengagement lever being configured to selectively move the cinch mechanism from the engaged state to the disengaged state.

In accordance with another aspect of the disclosure, the manual release mechanism includes a release link operably coupled to an inside release lever, the release link being moveable into engagement with the cinch disengagement lever while the cinch pulley is in the actuated position in response to actuation of the inside release lever to cause the cinch mechanism to move from the engaged state to the disengaged state.

In accordance with another aspect of the disclosure, a pin fixed to the cinch pulley is received for lost motion in a slot of the cinch disengagement lever, wherein the pin moves from a first end of the slot toward a second end of the slot when the cinch mechanism is in the engaged state and when the cinch pulley moves from the home position to the actuated position.

In accordance with another aspect of the disclosure, the pin moves back to the first end of the slot when the cinch mechanism is in the engaged state and when the cinch pulley moves from the actuated position to the home position.

In accordance with another aspect of the disclosure, the cinch disengagement lever is biased by a biasing member to cause the first end of the slot to be moved into engagement with the pin while the cinch pulley is in the home position, and wherein a cam fixed to the cinch pulley imparts a bias on the cinch disengagement lever while the cinch pulley is moved toward the actuated position to cause the cinch disengagement lever to move against the bias imparted by the biasing member, whereat the pin is moved out of engagement from the first end of the slot, and whereat the cinch disengagement lever is moved into alignment with the release link.

In accordance with another aspect of the disclosure, the biasing member is a toggle spring that releasably holds the cinch disengagement lever in a first position when the cinch mechanism is in the engaged state, and releasably holds the cinch disengagement lever in a second position when the cinch mechanism is in the disengaged state.

In accordance with another aspect of the disclosure, the cinch mechanism includes a cinch link moveable between a coupled position, whereat the cinch link is aligned for engagement with the ratchet and the cinch disengagement lever is in the first position, and a decoupled position, whereat the cinch link is not aligned for engagement with the ratchet and the cinch disengagement lever is in the second position.

In accordance with another aspect of the disclosure, the cinch link is biased toward the coupled position, and wherein the cinch link is moved to the decoupled position by the cinch disengagement lever in response to the cinch disengagement lever being moved by the release link in response to actuation of the inside release lever.

In accordance with another aspect of the disclosure, the cinch disengagement lever is moved by the cinch pulley from the second position to the first position, whereat the cinch link is moved from the decoupled position to the coupled position, when the cinch pulley is moved to the home position.

In accordance with another aspect of the disclosure, a closure latch assembly for a vehicle door has a latch mechanism including a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, and secondary striker capture position, whereat the pawl holds the ratchet in the secondary striker capture position, and a ratchet releasing position, whereat the pawl permits the ratchet to move to its striker release position. The closure latch assembly further includes a cinch pulley moveable between a home position and an actuated position, and a cinch disengagement lever operably coupled to the cinch pulley, with the cinch disengagement lever being moveable between a first position and a second position. The closure latch assembly further includes a cinch link coupled to the cinch pulley for movement between a coupled position, whereat the cinch link is aligned for engagement with the ratchet when the cinch pulley is moved from the home position to the actuated position to move the ratchet from the secondary striker capture position to the primary striker capture position, and a decoupled position, whereat the cinch link is not aligned for engagement with the ratchet. The closure latch assembly further includes a release link operably coupled to an inside release lever, the release link being moveable into engagement with the cinch disengagement lever while the cinch pulley is in the actuated position in response to actuation of the inside release lever to cause the cinch disengagement lever to move from the first position to the second position, whereupon the cinch link is moved by the cinch disengagement lever from the coupled position to the decoupled position, thereby allowing the ratchet to move independently from the cinch link.

In accordance with another aspect of the disclosure, a method of overriding a cinch mechanism of a closure latch assembly for a vehicle door includes: providing a latch mechanism having a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, a secondary striker capture position, whereat the pawl holds the ratchet in the secondary striker capture position, and a ratchet releasing position, whereat the pawl permits the ratchet to move to its striker release position. Further, providing a cinch mechanism moveable, while in an engaged state, from a home position to a cinch position, whereat the ratchet is moved from the secondary striker capture position to the primary striker capture position. Further yet, providing a manual release mechanism that is manually actuatable to move the cinch mechanism from the engaged state to a disengaged state, whereat the cinch mechanism is disengaged from the ratchet, wherein the ratchet is free to be moved from the primary striker capture position and the secondary striker capture position to the striker releasing position while the cinch mechanism is in the disengaged state.

In accordance with another aspect of the disclosure, the method can further include providing the manual release mechanism having a cinch disengagement lever coupled to a cinch pulley of the cinch mechanism and configuring the cinch disengagement lever to selectively move the cinch mechanism from the engaged state to the disengaged state.

In accordance with another aspect of the disclosure, the method can further include providing the manual release mechanism having a release link coupled to an inside release lever and configuring the release link to engage the cinch disengagement lever while the cinch pulley is in the actuated position in response to actuation of the inside release lever to cause the cinch mechanism to move from the engaged state to the disengaged state.

In accordance with another aspect of the disclosure, the method can further include disposing a pin of the cinch pulley in a slot of the cinch disengagement lever and configuring the pin to move from a first end of the slot toward a second end of the slot when the cinch pulley moves from the home position to the actuated position, and configuring the pin to move back to the first end of the slot when the cinch pulley moves from the actuated position to the home position.

In accordance with another aspect of the disclosure, the method can further include biasing the cinch disengagement lever with a toggle spring to cause the first end of the slot to be moved into engagement with the pin while the cinch pulley is in the home position, and providing a cam fixed to the cinch pulley to impart a bias on the cinch disengagement lever while the cinch pulley is moved toward the actuated position to cause the cinch disengagement lever to move against the bias imparted by the toggle spring, and configuring the toggle spring to releasably hold the cinch disengagement lever in a first position when the cinch mechanism is in the engaged state, and to releasably hold the cinch disengagement lever in a second position when the cinch mechanism is in the disengaged state.

In accordance with another aspect of the disclosure, the method can further include providing a cinch link moveable between a coupled position, whereat the cinch link is aligned for engagement with the ratchet and the cinch disengagement lever is in the first position, and a decoupled position, whereat the cinch link is not aligned for engagement with the ratchet and the cinch disengagement lever is in the second position.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

The drawings described herein have been provided to illustrate selected embodiments and specific features thereof and are not intended to limit the scope of the present disclosure. The present disclosure will now be described by way of example only with reference to the attached drawings, in which.

DETAILED DESCRIPTION OF EXAMPLE EMBODIMENTS

Figure 1:
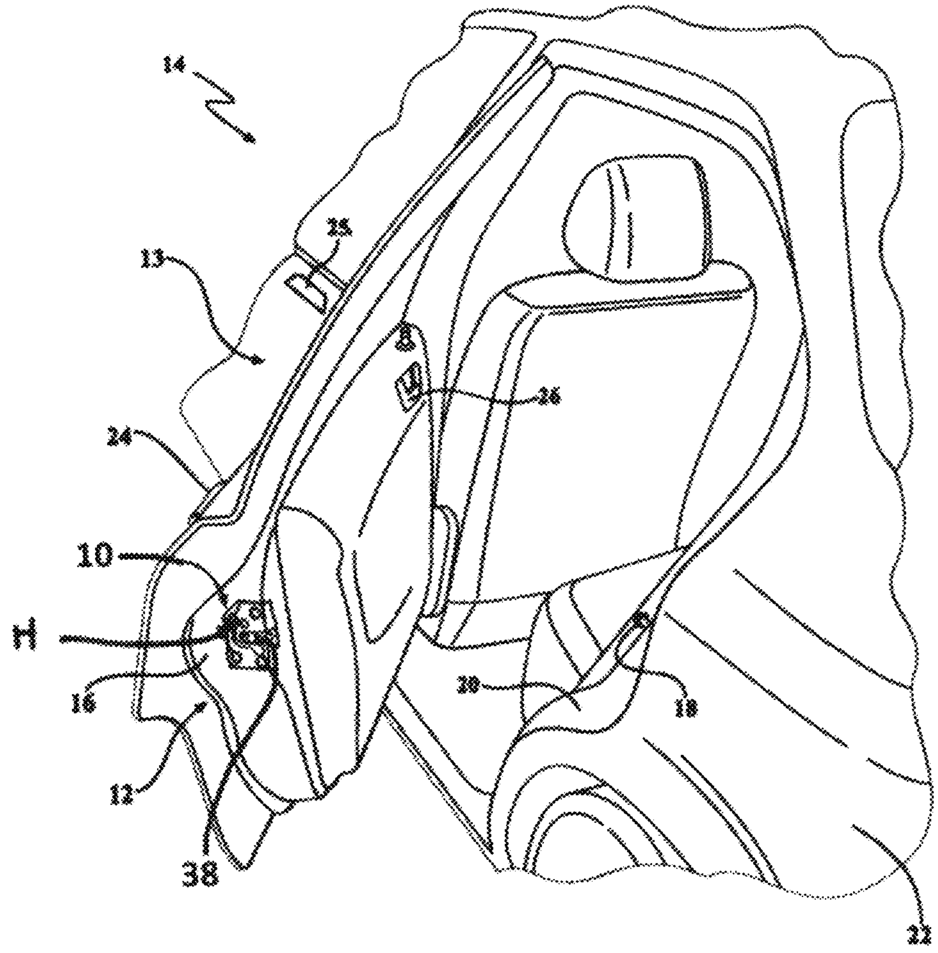
FIG. 1 is a perspective view of a motor vehicle having vehicle door equipped with a closure latch assembly constructed in accordance with aspects of the disclosure.

Example embodiments of a closure latch for use in motor vehicle door closure systems are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1, a closure latch assembly, also referred to as closure latch or latch assembly 10, for a closure panel, such as a swing door, shown as a rear door 12, by way of example and without limitation, of a motor vehicle 14 is shown positioned along a shut face portion 16 of door 12 and is configured to releasably engage and capture a striker 18 secured to a vehicle body 22 to extend within a door opening 20 formed in vehicle body 22 in response to movement of door 12 from an open position to a closed position. Door 12 is shown to include an outside door handle 24 and an inside door handle 26, both of which are operatively connected (i.e., electrically and/or mechanically) to closure latch assembly 10. While not shown, it is understood that a similar closure latch assembly is provided in association with a front door 13 of vehicle 14 shown to include its own outside door handle 25.

Figure 2:
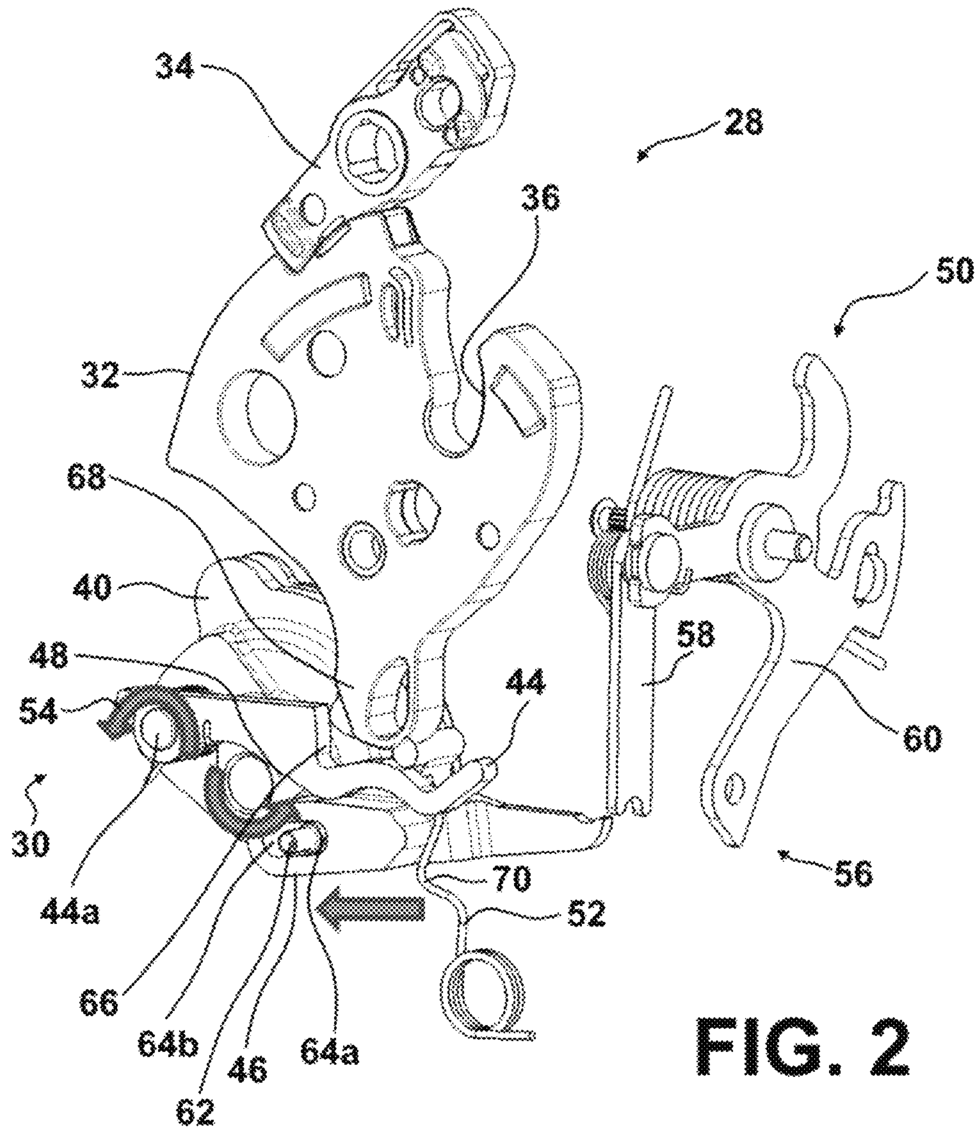
FIG. 2 is a perspective view of a latch mechanism and cinch mechanism of the closure latch assembly of FIG. 1, with the latch mechanism having a ratchet shown in a secondary ratchet holding position and the cinch mechanism having a cinch link shown in an engaged position, whereat the cinch link is aligned for engagement with a ratchet of the latch mechanism.
Figures 3A, 3B, 3C, 3D:
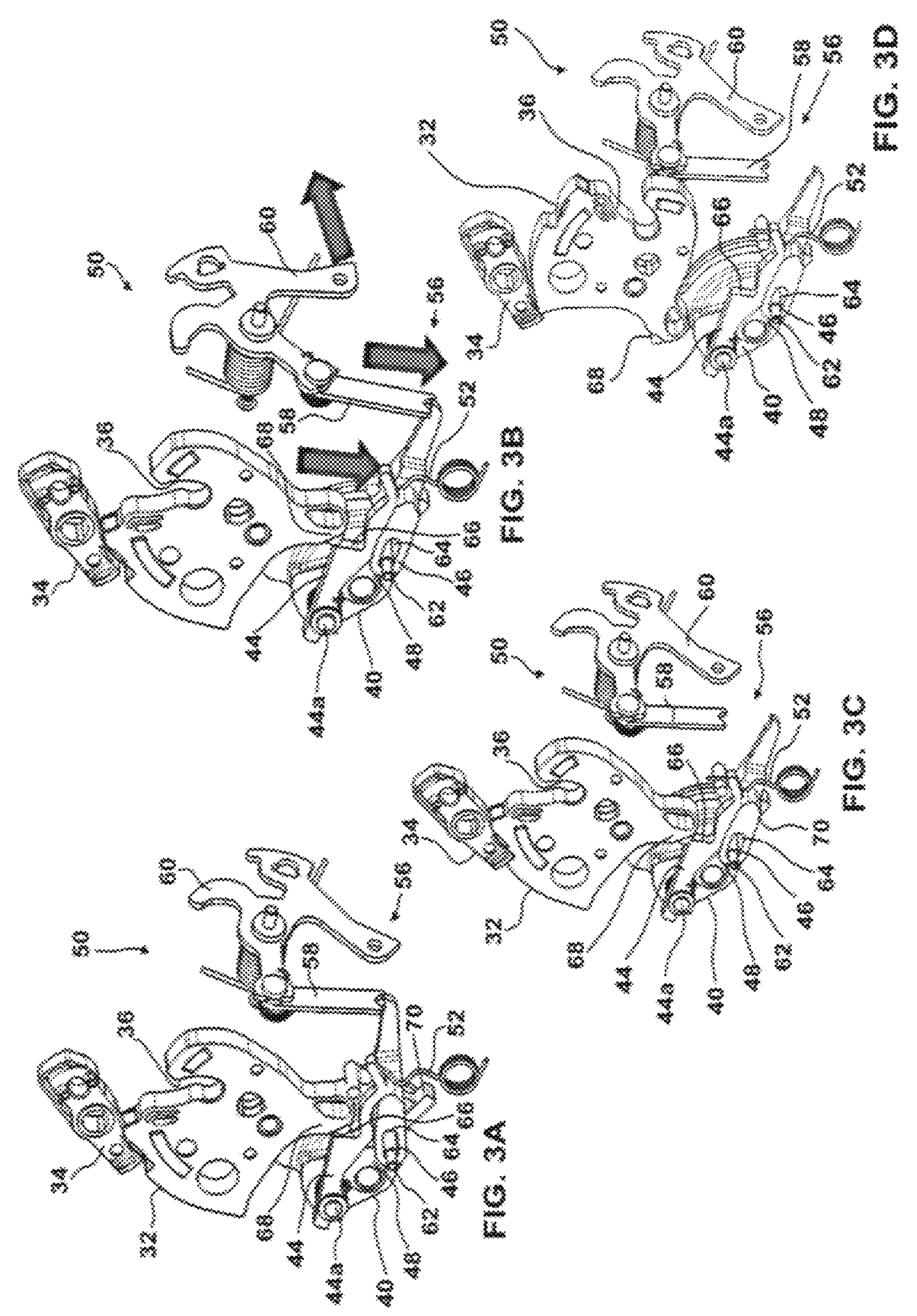
FIG. 3A is a view similar to FIG. 2, with the cinch mechanism illustrated in a failure state, whereat a cinch disengagement lever is moved from a home position by a cinch pulley to a first deployed position into alignment with an inside release link, with the cinch link remaining in the engaged position.
FIG. 3B is a view similar to FIG. 3A, showing an inside release lever and the inside release link moved from a home position to an actuated position, whereat the cinch disengagement lever is moved by the inside release link to a second deployed position, whereat the cinch link is moved by the cinch disengagement lever from the engaged position to a disengaged position, whereat the cinch link is no longer aligned for engagement with the ratchet of the latch mechanism.
FIG. 3C is a view similar to FIG. 3B, showing the inside release lever and the inside release link returned to the home position, with the cinch disengagement lever remaining in the disengaged position.
FIG. 3D is a view similar to FIG. 3C, illustrating the ratchet moved to a striker release position.

Referring now to FIG. 2, a non-limiting example embodiment of a latch mechanism 28 and cinch mechanism 30 of closure latch assembly 10 is shown, with latch mechanism 28 of closure latch assembly 10 shown in a secondary latch position, whereat closure panel 12 is held in a partially closed, also referred to as partially open, position. Latch mechanism 28 includes a ratchet 32 and a pawl 34. Ratchet 32 is pivotably mounted to a plate segment of a latch housing H and has a ratchet slot 36 alignable with a fishmouth slot 38 formed in latch housing H. Ratchet 32 is moveable between a primary closed or "striker capture" position (FIGS. 4A-4C), whereat striker 18 is held within fishmouth slot 38 via being captured in ratchet slot 36 and closure panel 12 is held in a fully closed position, a secondary striker capture position (FIG. 3C), whereat closure panel 12 is held in the partially closed position, and an open or "striker release" position (FIG. 3D), whereat striker 18 is free to be released from ratchet slot 36 and fishmouth slot 38 and closure panel 12 is free to be moved to an open position. Ratchet 32 is biased by a primary ratchet biasing member, such as a primary ratchet spring toward its striker release position. Pawl 34 is pivotably supported for movement between a secured, primary ratchet holding position, also referred to as "closed" position, whereat pawl 34 locates and holds ratchet 32 in its primary striker capture position, a secured, secondary ratchet holding position, whereat pawl 34 locates and holds ratchet 32 in its secondary striker capture position, and a ratchet release position, whereat pawl 34 is positioned to permit ratchet 32 to move to its striker release position, such as under a bias imparted by ratchet spring on ratchet 32. A pawl biasing member, such as a pawl spring, is operable to normally bias pawl 34 toward its open position.

Cinch mechanism 30 includes a cinch pulley 40 biased by a cinch pulley biasing member 42 toward a home position (FIG. 3C), a cinch link 44, and a cinch disengagement lever 46. Cinch link 44 is directly coupled to cinch pulley 40 via a cinch link pin 44*a* and is configured to be driven continuously and concurrently with cinch pulley 40 as cinch pulley 40 is driven during a cinching operation. Cinch disengagement lever 46 is configured to be driven by a cinch pulley cam, referred to simply as cam 48, during the cinching operation between a non-engageable position (FIGS. 2 and 4C), whereat cinch disengagement lever 46 is not engageable by an inside release mechanism 50, and an engageable position (FIG. 3A), whereat cinch disengagement lever 46 is engageable by inside release mechanism 50. Cam 48 can be formed as a single piece of material, also referred to as monolithic piece of material, with cinch pulley 40, or cam 48 could be welded or otherwise fixed to cinch pulley 40, if desired. The cinch disengagement lever 46 being moveable between the engageable and non-engageable positions provides a coupling/decoupling mechanism that automatically couples the cinch mechanism 30 with the latch mechanism 28 of the closure latch assembly 10 while in a cinching mode and allows manual decoupling of the cinch mechanism 30 from the latch mechanism 28 of the closure latch assembly 10 during interruption of power to the cinch mechanism 30.

Cinch disengagement lever 46 is biased by a cinch disengagement biasing member, also referred to as toggle feature or toggle spring, referred to hereafter as toggle spring 52, into one of two positions, with one position, also referred to as engaged state or engaged position (FIGS. 2, 3A, and 4C), being a position whereat cinch link 44 is coupled with ratchet 32 such that movement of cinch pulley 40 during the cinching operation causes ratchet 32 to be forcibly urged by cinch link 44 from the secondary striker capture position to the primary striker capture position, and the other position, also referred to as disengaged state or disengaged position (FIGS. 3B-3D, 4A, and 4B), being a position whereat cinch link 44 is de-coupled from ratchet 32, such that ratchet 32 is free to move independently from cinch link 44, such as from the secondary striker capture position to the primary striker capture position, for example. As such, while cinch disengagement lever 46 is held in the engaged position by toggle spring 52, cinch link 44 is also in an engaged position, also referred to as coupled position, for driving engagement with ratchet 32, and while cinch disengagement lever 46 is held in the disengaged position by toggle spring 52, cinch link 44 is also in a disengaged position, also referred to as de-coupled position, whereat ratchet 32 is not engageable by cinch link 44, with ratchet 32 being moveable relative to cinch link 44 while cinch link 44 remains stationary. Accordingly, if any problem occurs with movement of ratchet 32 during the power cinching operation, such as an interruption of powered movement, for example, actuation of inside release mechanism 50, while cinch disengagement lever 46 is in the engageable position, causes cinch disengagement lever 46 to be moved from then engaged position to the disengaged position, thereby causing cinch link 44 to be de-coupled from ratchet 32. Cinch link 44 is biased by a cinch link biasing member, also referred to a cinch link spring, shown schematically at 54, toward its engaged position.

Cinch mechanism 30 is moveable, while in the engaged state, from a home position, while the ratchet 32 is in the secondary striker capture position, to a cinch position, whereat the ratchet 32 is engaged by the cinch link 44 of the cinch mechanism 30 and moved to the primary striker capture position. Thereafter, cinch mechanism 30 is automatically reset back to the home position via cinch pulley biasing member 42, whereat the ratchet 32 remains the primary striker capture position. A manual release mechanism 56, including inside release mechanism 50, is operable to move the cinch mechanism 30 from the engaged state, whereat the cinch mechanism 30 is engaged with the ratchet 32, to the disengaged state, whereat the cinch mechanism 30 is disengaged from the ratchet 32, wherein the ratchet 32 is free to be returned to the primary striker capture position and/or moved from the primary striker capture position to the striker releasing position, such as via mechanical actuation via inside door handle 26 and/or powered actuation of a latch powered actuator (not shown) while the cinch mechanism 30 is in the disengaged state.

The manual release mechanism 56 includes cinch disengagement lever 46 operably coupled to cinch pulley 40 for lost motion with the cinch pulley 40 as the cinch pulley 40 rotates from the home position (FIGS. 2 and 4C) to the actuated position (FIGS. 3A-3D and 4A), with the cinch disengagement lever 46 being configured to selectively move the cinch mechanism 30 from the engaged state to the disengaged state, whereat the closure latch assembly 10 can be actuated, either mechanically by the inside door handle 26 or via powered release, to move the ratchet 32 to the striker release position.

Manual release mechanism 56 includes a release link 58 operably coupled to an inside release lever 60 of inside release mechanism 50, which is operably and mechanically actuatable via inside door handle 26. As discussed further below, the release link 58 is moveable into engagement with the cinch disengagement lever 46 while the cinch pulley 40 is in the actuated position in response to actuation of the inside release lever 60 to cause the cinch mechanism 30 to move from the engaged state to the disengaged state.

During the cinching process, as cinch pulley 40 is driven under power to move from the home position to the cinched, actuated position, cam 48 fixed to the cinch pulley 40 imparts a bias on the cinch disengagement lever 46 while the cinch pulley 40 is moved toward the actuated position to cause the cinch disengagement lever 46 to translate and move against a bias imparted by the biasing member (toggle spring) 52, wherein toggle spring 52 releasably holds the cinch disengagement lever 46 in a raised (as viewed in FIGS. 2, 3A and 4C) first position when the cinch mechanism 30 is in the engaged state, whereat the cinch link 44 is maintained in a coupled position, aligned for engagement with the ratchet 32, and releasably holds the cinch disengagement lever 46 in a lowered (as viewed in FIGS. 3B-3D and 4A-4B) second position when the cinch mechanism 30 is in the disengaged state, whereat the cinch link 44 is maintained in a decoupled position, and is not aligned for engagement with the ratchet 32. As cinch disengagement lever 46 is translated by cam 48 and moves against the bias imparted by toggle spring 52, a pin 62 fixed to the cinch pulley 40, with pin 62 being received for lost motion in a slot 64 of the cinch disengagement lever 46, moves from a first end 64*a* of the slot 64 toward a second end 64*b* of the slot 64 when the cinch mechanism 30 is in the engaged state. Accordingly, the pin 62 is moved out of engagement from the first end 64*a* of the slot 64 and the cinch disengagement lever 46 is ultimately moved into alignment with the release link 58 when cinch pulley 40 reaches the actuated position.

During the cinching process, cinch link 44 is driven by cinch pulley 40, whereupon a drive surface, shown as a shoulder 66 of cinch link 44, drives driven surface, shown as an arm 68 of ratchet 32, such that ratchet 32 is driven from the secondary striker capture position to the primary striker capture position. Then, during a cinch reset operation, when the cinch mechanism 30 is in the engaged state and when the cinch pulley 40 is moved under power via a powered cinch actuator (not shown) from the actuated position back to the home position, pin 64 moves back to the first end 64*a* of the slot 64 under the bias of toggle spring 52. Accordingly, the cinch disengagement lever 46 is biased by toggle spring 52 to cause the first end 64*a* of the slot 64 to be moved into engagement with the pin 62 when the cinch pulley 40 is in the home position.

If, during the cinching process, a power interruption to cinch power actuator is encountered, the cinch link 44 can be moved from the coupled position to the decoupled position by the cinch disengagement lever 46 in response to the cinch disengagement lever 46 being moved by the release link 58 in response to mechanical actuation of the inside release lever 60. This is made possible via the cinch disengagement lever 46 being aligned for engagement with the release link 58 during the cinching process, when the cinch pulley 40 is in or near the actuated position. As shown in FIGS. 3A-3D, mechanical actuation of the inside release mechanism 50 causes release link 58 to drive cinch disengagement lever 46 from the raised first position to the lowered second position along the toggle spring 52, whereupon an elbow, also referred to as spring detent 70, of toggle spring 52 releasably holds cinch disengagement lever 46 in the lowered second position after completing mechanical actuation of inside release mechanism 50. As cinch disengagement lever 46 is driven from the raised first position to the lowered second position, a catch, also referred to as drive arm 72 of cinch disengagement lever 46, which overhangs cinch link 44, engages cinch link 44 and pulls cinch link 44 downwardly concurrently with cinch disengagement lever 46, whereupon cinch link 44 is moved from the coupled position to the decoupled position, thereby moving shoulder 66 of cinch link 44 out from confronting engagement with arm 68 of ratchet 32. Accordingly, ratchet 32 is free to move back to the primary striker capture position and/or to the striker release position, whether via under mechanical actuation of the inside and/or outside door handle 26, 24 or via powered actuation of latch power actuator (not shown), without being blocked by cinch link 44, as long as cinch link 44 is held in the decoupled position by cinch disengagement lever 46.

Figures 4A, 4B, 4C:
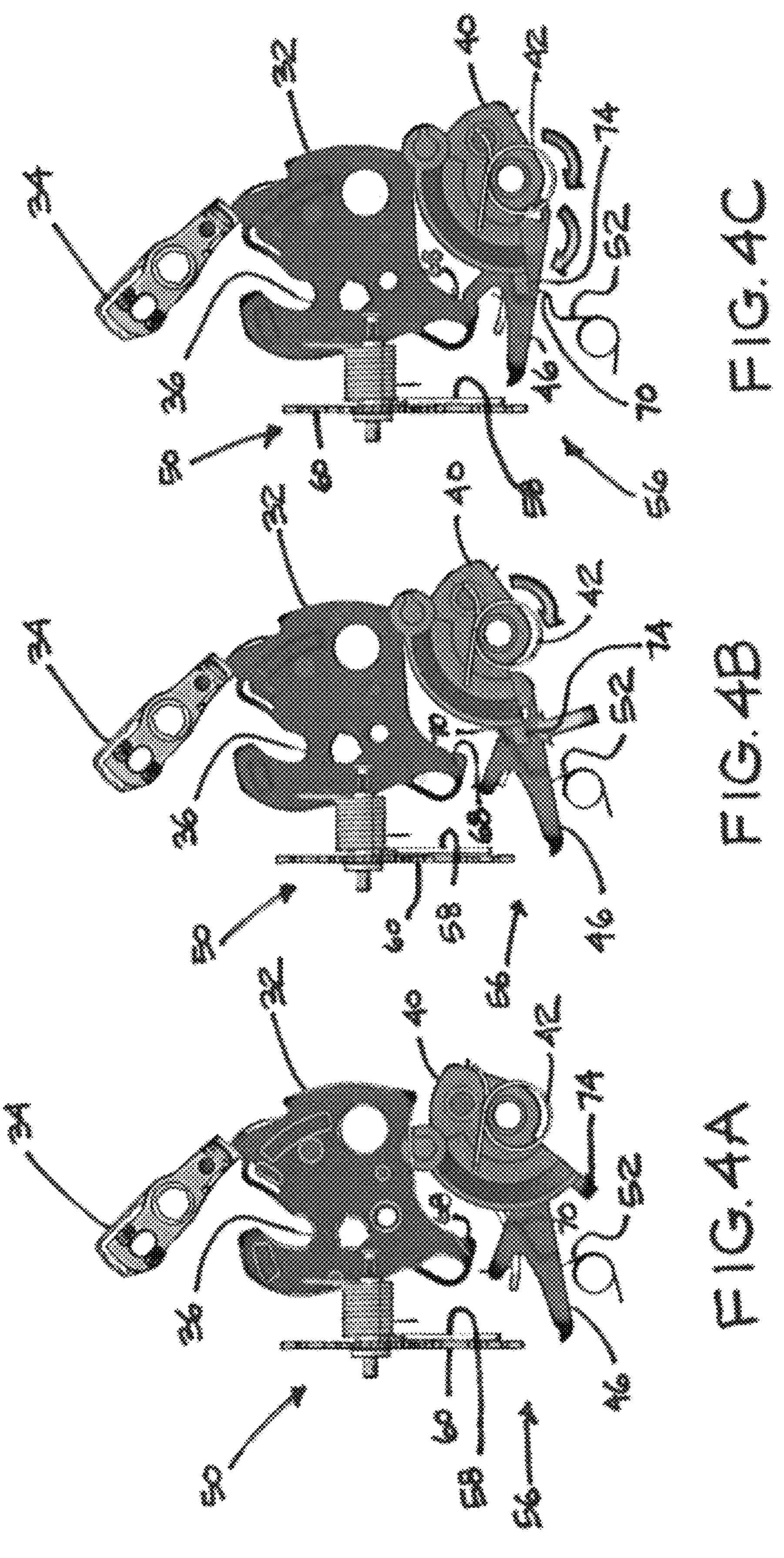
FIG. 4A illustrates a fragmentary plan view of the closure latch assembly showing an initial stage of the cinch disengagement lever being reset from the disengaged position to the engaged position, with the cinch pulley shown in an end of cinch position.
FIG. 4B is a view similar to FIG. 4A, showing continued progression of the reset of the cinch disengagement lever to the engaged position, with the cinch pulley being moved from the end of cinch position toward a home position.
FIG. 4C is a view similar to FIG. 4B, showing completion of the reset of the cinch disengagement lever to the engaged position, with the cinch pulley moved to the home position.

Then, upon restoration of power to cinch power actuator, a reset of the cinch mechanism may be performed, for example cinch pulley 40, as shown in FIGS. 4A-4C, is rotated from the actuated position (FIG. 4A) back to the reset or home position (FIG. 4C). As cinch pulley 40 returns to the home position, a projection, also referred to as leg 74 of cinch pulley 40, is rotated into engagement with toggle spring 52 to move spring detent 70 outwardly from engagement with cinch disengagement lever 46, thereby allowing spring disengagement lever 46 to return to the raised first position. As cinch disengagement lever 46 is returned to the first position, cinch link 44 returns from the decoupled position to the coupled, also referred to as engaged position, via bias imparted by cinch link biasing member 54. Accordingly, closure latch assembly 10 is returned to its fully functional state.

In accordance with another aspect of the disclosure, a method of overriding a cinch mechanism 30 of a closure latch assembly 10 for a vehicle door 12, 13 includes: providing a latch mechanism 28 having a ratchet 32 and a pawl 34, the ratchet 32 being moveable between a primary striker capture position, a secondary striker capture position, and a striker release position, the pawl 34 being moveable between a primary ratchet holding position, whereat the pawl 34 holds the ratchet 32 in the primary striker capture position, a secondary striker capture position, whereat the pawl 34 holds the ratchet 32 in the secondary striker capture position, and a ratchet releasing position, whereat the pawl 34 permits the ratchet 32 to move to its striker release position. Further, providing the cinch mechanism 30 moveable, while in an engaged state, from a home position to a cinch position, whereat the ratchet 32 is moved from the secondary striker capture position to the primary striker capture position. Further yet, providing a manual release mechanism 56 that is manually actuatable to move the cinch mechanism 30 from the engaged state to a disengaged state, whereat the cinch mechanism 30 is disengaged from the ratchet 32, wherein the ratchet 32 is free to be moved from the primary striker capture position and the secondary striker capture position to the striker releasing position while the cinch mechanism 30 is in the disengaged state.

In accordance with another aspect of the disclosure, the method can further include providing the manual release mechanism 56 having a cinch disengagement lever 46 coupled to a cinch pulley 40 of the cinch mechanism 30 and configuring the cinch disengagement lever 46 to selectively move the cinch mechanism 30 from the engaged state to the disengaged state.

In accordance with another aspect of the disclosure, the method can further include providing the manual release mechanism 56 having a release link 58 coupled to an inside release lever 60 and configuring the release link 58 to engage the cinch disengagement lever 46 while the cinch pulley 40 is in the actuated position in response to actuation of the inside release lever 60 to cause the cinch mechanism 30 to move from the engaged state to the disengaged state.

In accordance with another aspect of the disclosure, the method can further include disposing a pin 62 of the cinch pulley 40 in a slot 64 of the cinch disengagement lever 46 and configuring the pin 62 to move from a first end 64*a* of the slot 64 toward a second end 64*b* of the slot 64 when the cinch pulley 40 moves from the home position to the actuated position, and configuring the pin 62 to move back to the first end 64*a* of the slot 64 when the cinch pulley 40 moves from the actuated position to the home position.

In accordance with another aspect of the disclosure, the method can further include biasing the cinch disengagement lever 46 with a toggle spring 52 to cause the first end 64*a* of the slot 64 to be moved into engagement with the pin 62 while the cinch pulley 40 is in the home position, and providing a cam 48 fixed to the cinch pulley 40 to impart a bias on the cinch disengagement lever 46 while the cinch pulley 40 is moved toward the actuated position to cause the cinch disengagement lever 46 to move against the bias imparted by the toggle spring 52, and configuring the toggle spring 52 to releasably hold the cinch disengagement lever 46 in a first position when the cinch mechanism 30 is in the engaged state, and to releasably hold the cinch disengagement lever 46 in a second position when the cinch mechanism 30 is in the disengaged state.

In accordance with another aspect of the disclosure, the method can further include providing a cinch link 44 moveable between a coupled position, whereat the cinch link 44 is aligned for engagement with the ratchet 32 and the cinch disengagement lever 46 is in the first position, and a decoupled position, whereat the cinch link 44 is not aligned for engagement with the ratchet 32 and the cinch disengagement lever 46 is in the second position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure latch assembly for a vehicle door, comprising:

a latch mechanism including a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, and secondary striker capture position, whereat the pawl holds the ratchet in the secondary striker capture position, and a ratchet releasing position, whereat the pawl permits the ratchet to move to its striker release position;

a cinch mechanism moveable, while in an engaged state, from a home position while the ratchet is in the secondary striker capture position to a cinch position, whereat the ratchet is engaged by the cinch mechanism and moved to the primary striker capture position, and reset back to the home position, whereat the ratchet remains the primary striker capture position;

a manual release mechanism operable to move the cinch mechanism from the engaged state, whereat the cinch mechanism is engaged with the ratchet, to a disengaged state, whereat the cinch mechanism is disengaged from the ratchet;

wherein the ratchet is free to return to the primary striker capture position and/or moved from the primary striker capture position to the striker releasing position while the cinch mechanism is in the disengaged state; and wherein the manual release mechanism includes a cinch disengagement lever operably coupled to a cinch pulley of the cinch mechanism for lost motion with the cinch pulley as the cinch pulley rotates from a home position to an actuated position, the cinch disengagement lever being configured to selectively move the cinch mechanism from the engaged state to the disengaged state.

2. The closure latch assembly of claim 1, wherein the manual release mechanism includes a release link operably coupled to an inside release lever, the release link being moveable into engagement with the cinch disengagement lever while the cinch pulley is in the actuated position in response to actuation of the inside release lever to cause the cinch mechanism to move from the engaged state to the disengaged state.

3. The closure latch assembly of claim 2, wherein a pin fixed to the cinch pulley is received for lost motion in a slot of the cinch disengagement lever, wherein the pin moves from a first end of the slot toward a second end of the slot when the cinch mechanism is in the engaged state and when the cinch pulley moves from the home position to the actuated position.

4. The closure latch assembly of claim 3, wherein the pin moves back to the first end of the slot when the cinch mechanism is in the engaged state and when the cinch pulley moves from the actuated position to the home position.

5. The closure latch assembly of claim 4, wherein the cinch disengagement lever is biased by a biasing member to cause the first end of the slot to be moved into engagement with the pin while the cinch pulley is in the home position, and wherein a cam fixed to the cinch pulley imparts a bias on the cinch disengagement lever while the cinch pulley is moved toward the actuated position to cause the cinch disengagement lever to move against the bias imparted by the biasing member, whereat the pin is moved out of engagement from the first end of the slot, and whereat the cinch disengagement lever is moved into alignment with the release link.

6. The closure latch assembly of claim 5, wherein the biasing member is a toggle spring that releasably holds the cinch disengagement lever in a first position when the cinch mechanism is in the engaged state, and releasably holds the cinch disengagement lever in a second position when the cinch mechanism is in the disengaged state.

7. The closure latch assembly of claim 6, wherein the cinch mechanism includes a cinch link moveable between a coupled position, whereat the cinch link is aligned for engagement with the ratchet and the cinch disengagement lever is in the first position, and a decoupled position, whereat the cinch link is not aligned for engagement with the ratchet and the cinch disengagement lever is in the second position.

8. The closure latch assembly of claim 7, wherein the cinch link is biased toward the coupled position, and wherein the cinch link is moved to the decoupled position by the cinch disengagement lever in response to the cinch disengagement lever being moved by the release link in response to actuation of the inside release lever.

9. The closure latch assembly of claim 1, wherein the cinch mechanism moved from the engaged state to the disengaged state by the manual release mechanism is configured to remain in the disengaged state until a reset operation of the cinch mechanism.

10. A closure latch assembly for a vehicle door, comprising:

a latch mechanism including a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, and secondary striker capture position, whereat the pawl holds the ratchet in the secondary striker capture position, and a ratchet releasing position, whereat the pawl permits the ratchet to move to its striker release position;

a cinch pulley moveable between a home position and an actuated position;

a cinch disengagement lever operably coupled to the cinch pulley, the cinch disengagement lever being moveable between a first position and a second position;

a cinch link coupled to the cinch pulley for movement between a coupled position, whereat the cinch link is aligned for engagement with the ratchet when the cinch pulley is moved from the home position to the actuated position to move the ratchet from the secondary striker capture position to the primary striker capture position, and a decoupled position, whereat the cinch link is not aligned for engagement with the ratchet; and a release link operably coupled to an inside release lever, the release link being moveable into engagement with the cinch disengagement lever while the cinch pulley is in the actuated position in response to actuation of the inside release lever to cause the cinch disengagement lever to move from the first position to the second position, whereupon the cinch link is moved by the cinch disengagement lever from the coupled position to the decoupled position.

11. The closure latch assembly of claim 10, further including a cinch link biasing member configured to bias the cinch link toward the coupled position.

12. The closure latch assembly of claim 11, further including a toggle spring configured to bias the cinch disengagement lever to releasably remain in the first and second positions.

13. The closure latch assembly of claim 10, further including a cam fixed to the cinch pulley, the cam configured to move the cinch disengagement lever into alignment with the release link when the cinch pulley is moved to the actuated position.

14. A method of overriding a cinch mechanism of a closure latch assembly for a vehicle door, comprising:

providing a latch mechanism including a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, a secondary striker capture position, whereat the pawl holds the ratchet in the secondary striker capture position, and a ratchet releasing position, whereat the pawl permits the ratchet to move to its striker release position;

providing the cinch mechanism moveable, while in an engaged state, from a home position to a cinch position, whereat the ratchet is moved from the secondary striker capture position to the primary striker capture position;

providing a manual release mechanism that is manually actuatable to move the cinch mechanism from the engaged state to a disengaged state, whereat the cinch mechanism is disengaged from the ratchet, wherein the ratchet is free to be moved from the primary striker capture position and the secondary striker capture position to the striker releasing position while the cinch mechanism is in the disengaged state; and further including providing the manual release mechanism having a cinch disengagement lever coupled to a cinch pulley of the cinch mechanism and configuring the cinch disengagement lever to selectively move the cinch mechanism from the engaged state to the disengaged state.

15. The method of claim 14, further including providing the manual release mechanism having a release link coupled to an inside release lever and configuring the release link to engage the cinch disengagement lever while the cinch pulley is in the actuated position in response to actuation of the inside release lever to cause the cinch mechanism to move from the engaged state to the disengaged state.

16. The method of claim 15, further including disposing a pin of the cinch pulley in a slot of the cinch disengagement lever and configuring the pin to move from a first end of the slot toward a second end of the slot when the cinch pulley moves from the home position to the actuated position, and configuring the pin to move back to the first end of the slot when the cinch pulley moves from the actuated position to the home position.

17. The method of claim 16, further including biasing the cinch disengagement lever with a toggle spring to cause the first end of the slot to be moved into engagement with the pin while the cinch pulley is in the home position, and providing a cam fixed to the cinch pulley to impart a bias on the cinch disengagement lever while the cinch pulley is moved toward the actuated position to cause the cinch disengagement lever to move against the bias imparted by the toggle spring, and configuring the toggle spring to releasably hold the cinch disengagement lever in a first position when the cinch mechanism is in the engaged state, and to releasably hold the cinch disengagement lever in a second position when the cinch mechanism is in the disengaged state.

18. The method of claim 17, further including providing a cinch link moveable between a coupled position, whereat the cinch link is aligned for engagement with the ratchet and the cinch disengagement lever is in the first position, and a decoupled position, whereat the cinch link is not aligned for engagement with the ratchet and the cinch disengagement lever is in the second position.

19. A closure latch assembly for a vehicle door, comprising:

a latch mechanism including a ratchet and a pawl, the ratchet being moveable between a primary striker capture position, a secondary striker capture position, and a striker release position, the pawl being moveable between a primary ratchet holding position, whereat the pawl holds the ratchet in the primary striker capture position, and secondary striker capture position, whereat the pawl holds the ratchet in the secondary striker capture position, and a ratchet releasing position, whereat the pawl permits the ratchet to move to its striker release position;

a cinch mechanism moveable, while in an engaged state, from a home position while the ratchet is in the secondary striker capture position to a cinch position, whereat the ratchet is engaged by the cinch mechanism and moved to the primary striker capture position, and reset back to the home position, whereat the ratchet remains the primary striker capture position;

a manual release mechanism operable to move the cinch mechanism from the engaged state, whereat the cinch mechanism is engaged with the ratchet, to a disengaged state, whereat the cinch mechanism is disengaged from the ratchet;

wherein the ratchet is free to return to the primary striker capture position and/or moved from the primary striker capture position to the striker releasing position while the cinch mechanism is in the disengaged state; and wherein the cinch mechanism moved from the engaged state to the disengaged state by the manual release mechanism is configured to remain in the disengaged state until a reset operation of the cinch mechanism.

20. The closure latch assembly of claim 19, further comprising a cinch disengagement lever moveable by the manual release mechanism to a position that maintains the cinch mechanism in the disengaged state, and a detent spring for holding the cinch disengagement lever in the position that maintains the cinch mechanism in the disengaged state.

21. The closure latch assembly of claim 20, wherein the cinch disengagement lever is moveable to a position that allows the cinch mechanism to move to the engaged state upon the detent spring being moved by the cinch mechanism during the reset operation.

22. The closure latch of claim 21, wherein the manual release mechanism is operable during a power failure event of a cinch power actuator to move the cinch mechanism from the engaged state to the disengaged state, whereat the cinch mechanism is disengaged from the ratchet, wherein upon restoration of power to the cinch power actuator, a reset of the cinch mechanism may be performed to move the cinch mechanism from the disengaged state to the engaged state.

23. The closure latch of claim 19, wherein the manual release mechanism operable during a power failure event of a cinch power actuator to move the cinch mechanism from the engaged state to the disengaged state, whereat the cinch mechanism is disengaged from the ratchet, wherein upon restoration of power to the cinch power actuator, a reset of the cinch mechanism may be performed to move the cinch mechanism from the disengaged state to the engaged state.

* * * * *